United States Patent Office
2,784,228
Patented Mar. 5, 1957

2,784,228

ALKALINE HYDROGENATION OF OXIMINOKETONES

Walter H. Hartung, Chapel Hill, N. C., assignor to North Carolina Pharmaceutical Research Foundation, Inc., Chapel Hill, N. C., a corporation of North Carolina No Drawing. Application August 26, 1953,
Serial No. 376,747

6 Claims. (Cl. 260—570.6)

The present invention is concerned with an improvement in the process for the catalytic reduction of alpha-oximino ketones.

Prior to the present discovery, several methods had been developed for the synthesis of norephedrine and norephedrine-like compounds, among which methods the catalytic reduction of alpha-oximino ketones seemed to be most desirable. The catalytic reduction process formerly employed involved reducing the alpha-oximino ketones by catalytic hydrogenation in an acid reaction medium. While this process yielded the desired alpha-amino alcohol, it presented several major problems to the chemist. One of the difficulties was that the reduction needed to be carried out in the presence of a mixture of absolute alchol and hydrogen chloride. The preparation of this medium was very difficult and time consuming as precautions had to be observed to maintain both the alcoholic solution and hydrogen chloride gas under anhydrous conditions and also because of the difficulty of adding the precise quantity of dry hydrogen chloride to produce the optimum pH value to assure a maximum yield of the amino alcohol. Further difficulties were encountered in the preparation of the reaction medium because of the corrosive nature of hydrogen chloride which necessitated the use of special equipment and careful handling to avoid injury to the chemist and his equipment. Another precaution which the chemist needed to observe was the use of the proper grade of catalyst as all grades of palladium are not operative in this procedure.

Because of the problems connected with the reduction of alpha-oximino ketones according to the previously used method, it has long been felt that a more practical and satisfactory means should be developed for preparing the desired amino alcohols and in particular norephedrine and norephedrine-like compounds. However, as the catalytic reduction of alpha-oximino ketones yielded only a single racemic modification of the desired amino alcohol instead of the two diastereoisomeric racemates other synthesis usually gave, it was particularly desirable to find a more efficient and less hazardous means by which the alpha-oximino ketones could be reduced to the corresponding amino alcohols.

After considerable investigation, it was discovered that alpha-oximino ketones could be reduced catalytically in an alkaline menstruum. This discovery was surprising because during the course of the investigation, several attempts had been made to carry out the reduction in a neutral solution. These experiments met with complete failure as no amino alcohol could be isolated. Upon analyzing the reaction mixture following the attempts to reduce catalytically the alpha-oximino ketone in the presence of neutral absolute ethanol, it was found that hydrogenation ceased with the formation of a secondary amine of undetermined structure, an oximino alcohol and other unidentified by-products. In view of the fact that substituting a neutral alcoholic medium for the acid alcoholic medium formerly employed in the catalytic reduction of alpha-oximino ketones resulted in not only incomplete hydrogenation but in part at least reduction in an undesired direction, it was extremely surprising to discover that when the reaction medium was made alkaline that the alpha-oximino ketone was reduced readily and in good yield to the desired amino alcohol.

The discovery that alpha-oximino ketones could be reduced in an alkaline reaction medium completely overcame all the prior art difficulties and made it possible for the first time to reduce alpha-oximino ketones in a safe, economical and simple manner. By employing this improved method it was no longer necessary to use absolute alcohol as the solvent because when the reaction medium is alkaline, water alone serves as the solvent or, if desired, ordinary alcohol, or any solvent can be used which has the dual property of being miscible with water and of being a solvent for the alpha-oximino ketone. Also the method by which the pH value of the medium is adjusted is materially simplified. In place of the time consuming and hazardous prior art method of acidifying absolute alcohol by bubbling into it a quantity of dry hydrogen chloride gas coupled with the necessity of exercising great care in order to maintain the system under anhydrous conditions, the improved process of this invention makes it possible to weigh out the desired quantity of alkali, dissolve it in water and then either dissolve the oximino ketone in this medium or incorporate an organic solvent in the alkaline solution or in the alkaline solution containing the oximino ketone. By employing the process of this invention, it is also possible to use pure palladium as the catalyst or palladium with platinum or rhodium or merely platinum instead of the particular operable grade of catalyst needed when the reduction of alpha-oximino ketone was conducted in the presence of an acidified alcoholic solution.

An object of this invention, therefore, is to provide an improved process for converting an alpha-oximino ketone to the corresponding amino alcohol.

A further object is to provide an improved process for reducing an alpha-oximino ketone to the corresponding amino alcohol which avoids the difficulties encountered in the prior process wherein reduction was effected in the presence of an anhydrous acidified alcoholic medium.

A further object is to provide a more practicable method for preparing alpha-amino alcohols and in particular, the alpha-amino alcohols, norephedrine and norephedrine-like compounds, which are used extensively as bronchodilators and nasal vasoconstrictors.

Thus the process of this invention comprises the reduction by catalytic hydrogenation of an alpha-oximino ketone under alkaline conditions. A preferred embodiment of this invention can be illustrated by the following representative reaction formula:

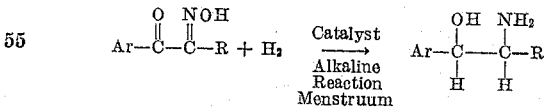

wherein Ar is an aryl radical for example the phenyl radical or optionally a mono- or poly-substituted phenyl radical, the substituent or substituents attached to the aryl or phenyl nucleus being of a type which will not interfere with the reduction of the alpha-oximino ketone portion of the molecule. Examples of suitable substituents are lower alkyl, hydroxy, lower alkoxy or nitro radicals. R is hydrogen or an alkyl, aryl or an aralkyl group advantageously each of low molecular weight, for example, methyl, ethyl, propyl, phenyl, benzyl, phenethyl and the like.

In practicing this invention, the alpha-oximino ketone can be dissolved in an aqueous alkaline solution or it can be dissolved in an aqueous alkaline solution to which an organic solvent for the oximino ketone is added either prior to or simultaneously with the addition of the ketone. Suitable organic solvents are alcohols and ethers including cyclic ethers which are miscible with water and which will dissolve the alpha-oximino ketone. Examples of these solvents are ethanol, 1,4-dioxane and tetrahydrofurane, although other solvents will be apparent to chemists skilled in this art. The reaction menstruum can be made alkaline by adding, for example, the desired quantity of an alkali metal hydroxide, advantageously sodium hydroxide or potassium hydroxide or other suitable alkalinizing agents such as ammonia, pyridine and the like. A 2.5% to 5% alkaline solution is suitable for use as the reaction menstruum provided there is at least about one equivalent of the alkalinizing agent for each equivalent of substrate, although the ratio of alkalinizing agent to substrate can be somewhat greater or slightly less without interfering with the reduction of the alpha-oximino ketone. While the catalyst of choice is palladium, other catalysts can be used, for example, platinum can be substituted therefor or a mixture of rhodium and palladium or platinum and palladium, each mixture advantageously in the ratio of 1 part of rhodium or platinum to 50 parts of palladium. In preparing the catalyst it is preferable but not necessary to support it on a suitable carrier by known procedures. While the invention has been illustrated in the examples below as taking place at room temperature, the reduction can be carried out at other temperatures, that is, at temperatures either above or below room temperature. Suitable temperature at which to conduct the reduction will depend in part upon the substrate employed and upon its concentration. Thus, upon selection of the oximino-ketone and the quantity of it to be used, the most advantageous temperature at which to conduct the reduction will be apparent to the chemist.

The following examples illustrate the new process of this invention. It is to be understood, however, that these examples are illustrative and not limitative and that modifications can be made in the procedural steps without departing from the scope of the invention.

The catalyst used in the following examples was prepared by adding 16 ml. of 2.5% palladium chloride solution to a solution of 6.0 g. of anhydrous sodium acetate in 100 ml. of water to which 4.0 g. of "Nuchar," a proprietary brand of activated charcoal, had been added. The mixture was hydrogenated for 15 minutes, filtered and the catalyst washed and then dried under vacuum over concentrated sulfuric acid. The catalyst was divided into two equal parts and each part was called 2 g. of standard palladium catalyst.

*Example 1.—Reduction of 1,3-diphenyl - 2 oximino-propanone.*—To a mixture of 12.0 g. (0.05 mole) of 1,3-diphenyl-2-oximino-propanone in 100 ml. of 2.5% alcoholic sodium hydroxide solution (prepared by dissolving 2.5 g. of sodium hydroxide pellets in 2.5 ml. of water and adding thereto 95 ml. of commercial absolute alcohol), was added 2 g. of standard palladium catalyst. The mixture was hydrogenated in a Parr hydrogenator equipped with a pressure gauge and automatic shaking attachment. The reduction was carried out at room temperature under an initial hydrogen atmosphere of 60 pounds per square inch. The reduction stopped after 0.154 mole of hydrogen had been absorbed. The mixture was filtered and the filter was washed with 100 ml. of alcohol, then with 50 ml. of water. The mixture, after being neutralized to Congo red with dilute hydrochloric acid, was evaporated on a water bath to remove the alcohol. The residue was dissolved in 200 ml. of boiling water and the insoluble matter separated by filtration. To the cooled filtrate was added 30 ml. of concentrated ammonia. The basic mixture then was extracted with 200 ml. and 100 ml. portions of ether in succession. The crude base obtained from the ethereal extract amounted to 11.8 g., M. P. 110–116° C., which, on recrystallization from 60 ml. of benzene, yielded 8.8 g. (77.5%) of 1,3-diphenyl-2-amino-propanol, M. P. 118° C.

*Example 2.—Reduction of α-oximinopropiophenone.*—To a mixture of 16.3 g. (0.1 mole) of α-oximinopropiophenone in 100 ml. of 5% alcoholic sodium hydroxide solution (prepared by dissolving 5 g. of sodium hydroxide pellets in 5 ml. of water and adding thereto 90 ml. of commercial absolute alcohol), was added 2 g. of standard palladium catalyst. The mixture was hydrogenated as described in Example 1 and the reduction stopped after 0.265 mole of hydrogen had been absorbed in about 1¼ hours. The mixture was filtered and the filter was washed with 100 ml. of alcohol, and then with 50 ml. of water. The filtrate, after being neutralized to Congo red with dilute hydrochloric acid, was evaporated to dryness on a water bath. The residue was dissolved in 150 ml. of water. After removal of the trace of insoluble substance by filtration, the solution was made strongly alkaline by adding 60 ml. of 20% sodium hydroxide solution. The mixture was then extracted successively with 200 ml., 200 ml. and 100 ml. portions of ether. The crude base obtained from the etheral extract amounted to 12.3 g., which, on recrystallization from 100 ml. of benzene, yielded 10.1 g. (66.9%) of 2-amino-1-phenylpropanol, M. P. 102–103° C.

*Example 3.—Reduction of α-oximino-4-hydroxypropiophenone.*—By replacing α-oximinopropiophenone in Example 2 by an equivalent amount of α-oximino-4-hydroxypropiophenone and following substantially the same procedure described in Example 2, there is obtained 2-amino-1-(p-hydroxyphenyl)-1-propanol.

*Example 4.—Reduction of α-oximino-3,4-dimethoxypropiophenone.*—To a mixture of 11.2 g. (0.05 mole) of α-oximino-3,4-dimethoxypropiophenone in 100 ml. of 2.5% sodium hydroxide solution (prepared as described in Example 1), was added 2 g. of standard palladium catalyst. The mixture was hydrogenated as described in Example 1, and the reduction stopped after 0.101 mole of hydrogen had been absorbed in about 2½ hours. The mixture was filtered and the filter washed successively with 50 ml. of alcohol and 50 ml. of water. The mixture, after being neutralized to Congo red with dilute hydrochloric acid, was concentrated to about 80 ml. on a water bath. To the cooled solution was added 15 ml. of concentrated ammonium hydroxide and the mixture was extracted with three successive 100 ml. portions of ether. The aqueous solution then was made strongly alkaline by addition of an equal volume of 20% sodium hydroxide solution. The precipitate was collected and the filtrate was extracted with three successive 100 ml. portions of ether. The base obtained amounted to 4.1 g. Upon recrystallization from benzene, 1.4 g. of the base, melting at 138–139° C., was obtained. It formed the hydrochloride of 3,4-dimethoxyphenyl-α-aminoethyl-carbinol, melting at 222–223° C.

*Example 5.—Reduction of α-oximino-4-methylpropiophenone.*—By replacing the α-oximino-3,4-dimethoxypropiophenone in Example 4 by an equivalent quantity of α-oximino-4-methylpropiophenone and following substantially the same procedure described in Example 4, 2-amino-1-(p-tolyl)-1-propanol is obtained.

*Example 6.—Reduction of oximinoacetophenone.*—To a mixture of 14.9 g. (0.1 mole) of oximinoacetophenone in 100 ml. of 5% alcoholic sodium hydroxide solution (0.125 mole) (prepared as described in Example 2), was added 2 g. of standard palladium catalyst. On hydrogenation by the process described in Example 1, the reduction stopped after 0.178 mole of hydrogen was absorbed in about 2½ hours. The mixture was filtered and the filter was washed with 20 ml. of alcohol. The dark red-colored solution was made acidic by adding dilute hydrochloric acid. The mixture was concentrated to about 100 ml. on a water bath to remove the alcohol, then was diluted to about 400 ml. with water, the resulting mixture heated to broiling with 2 g. of "Norit," a proprietary brand of decolorizing charcoal, and the final mixture was filtered. After chilling over night, 5.0 g. of crystalline powder, M. P. 174–176° C., was obtained. The product was only slightly soluble in hot water. The filtrate, when concentrated to about 100 ml. and cooled, was made strongly alkaline by adding 40 ml. of 20% sodium hydroxide solution. The mixture was extracted with three successive 100 ml. portions of ether. One to two grams of dark, gummy residue representing the product in an impure state was obtianed from the ethereal extracts but was not purified.

*Example 7.—Reduction of benzilmonoxime.*—To a solution of 11.3 g. (0.05 mole) of benzilmonoxime in 25 cc. of 10% aqueous sodium hydroxide and 100 cc. ethanol, was added 2 g. of standard palladium catalyst. The mixture was hydrogenated in the same manner as described in Example 1. The reduction stopped after about 0.15 mole of hydrogen had been absorbed. The catalyst then was removed and the product isolated in the usual manner. Yield, 10.5 g. of 1.2-diphenyl-2-amino-ethanol, M. P. of the crude material 160° C. (uncorected) (reported M. P. 163° C.).

When the alkaline menstruum of Examples 1–7 is replaced by ethanolic potassium hydroxide or merely by an aqueous potassium hydroxide solution, the corresponding amino alcohols are obtained. Similarly when the ethanol or water employed as a solvent in Examples 1–7 is replaced by methanol, dioxane or tetrahydrofurane and the selected solvent is made alkaline with sodium hydroxide or potassium hydroxide, the corresponding amino alcohol is obtained by following the procedure outlined in any one of these examples. Examples of the reduction of alpha-oximino ketones in these menstruums are evident from a consideration of the above discussion and separate examples to illustrate the use of them are not included, for to do so would only lengthen the disclosure without adding additional significant teaching thereto.

Likewise, when the palladium catalyst employed in any of the methods described above is replaced by platinum or by a mixture of platinum and palladium or rhodium and palladium, advantageously in the ratio of one part of platinum or rhodium to 50 parts of palladium, the corresponding amino alcohols are again obtained. Examples of the reduction of alpha-oximino ketones in the presence of these catalysts and employing any of the above described alkaline reaction menstruums will be evident from the above discussion and experimental details are not added to avoid making the disclosure repititious.

It is evident, therefore, from the examples as well as the above discussion that modifications can be made in the preparation of the alkaline menstruum and in the catalyst employed without departing from the scope of this invention.

What is claimed is:

1. A process for reducing alpha-oximino ketones having the general formula

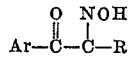

wherein Ar is selected from the group consisting of mononuclear aryl, lower alkyl-mononuclear aryl, hydroxy-mononuclear aryl and lower alkoxy-mononuclear aryl radicals and R is selected from the group consisting of hydrogen, a lower alkyl, a mononuclear aryl and a mononuclear aryl-lower alkyl radical which comprises hydrogenating the selected alpha-oximino ketone in the presence of an alkali metal hydroxide and a palladium catalyst.

2. A process for reducing alpha-oximino ketones having the general formula

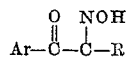

wherein Ar is selected from the group consisting of mononuclear aryl, lower alkyl-mononuclear aryl, hydroxy-mononuclear aryl and lower alkoxy-mononuclear aryl radicals and R is selected from the group consisting of hydrogen, a lower alkyl, a mononuclear aryl and a mononuclear aryl-lower alkyl radical which comprises hydrogenating the selected alpha-oximino ketone in the presence of an alcoholic solution of an alkali metal hydroxide and a palladium catalyst.

3. A process for reducing alpha-oximino ketones, as claimed in claim 1, which comprises hydrogenating the selected alpha-oximino ketone in the presence of sodium hydroxide solution comprising at least one equivalent of sodium hydroxide per equivalent of substrate and a palladium catalyst.

4. A process for reducing alpha-oximino ketones, as claimed in claim 2, which comprises hydrogenating the selected alpha-oximino ketone in the presence of an aqueous alcoholic sodium hydroxide solution comprising at least one equivalent of sodium hydroxide per equivalent of substrate and a palladium catalyst.

5. A process for reducing alpha-oximino ketones, as claimed in claim 2, which comprises hydrogenating the selected alpha-oximino ketone in the presence of an alcoholic sodium hydroxide solution comprising at least one equivalent of sodium hydroxide per equivalent of substrate and a palladium catalyst.

6. A process for the reduction of alpha-oximinopropiophenone which comprises hydrogenating alpha-oximinopropiophenone in the presence of an alcoholic sodium hydroxide solution comprising at least one equivalent of sodium hydroxide per equivalent of substrate and palladium catalyst.

References Cited in the file of this patent

UNITED STATES PATENTS 1,989,093    Hartung _____ Jan. 29, 1935